United States Patent [19]

Snellman et al.

[11] 4,077,831
[45] * Mar. 7, 1978

[54] SHEET BINDING APPARATUS

[76] Inventors: Donald L. Snellman, 2807 W. Galer, Seattle, Wash. 98199; John C. Kuspert, 8844 36th SW., Seattle, Wash. 98126; Arthur G. Saunders, 19827 Maple Valley Hwy., Maple Valley, Wash. 98038

[*] Notice: The portion of the term of this patent subsequent to Feb. 22, 1994, has been disclaimed.

[21] Appl. No.: 735,050

[22] Filed: Oct. 22, 1976

Related U.S. Application Data

[62] Division of Ser. No. 387,541, Aug. 10, 1973, Pat. No. 4,009,071.

[51] Int. Cl.² ............... B32B 31/00; B65C 11/04
[52] U.S. Cl. ........................... 156/563; 11/1 AD; 156/578
[58] Field of Search ............ 156/305, 563, 578; 11/1 AD, 1 B

[56] References Cited

U.S. PATENT DOCUMENTS

| | | | |
|---|---|---|---|
| 1,285,914 | 11/1918 | Bone | 11/1 B |
| 2,269,870 | 1/1942 | Carter | 156/305 |
| 2,720,665 | 10/1955 | Kile | 11/1 AD |
| 2,752,619 | 7/1956 | Hodge | 11/1 AD |
| 2,820,974 | 1/1958 | Hodge | 11/1 AD |
| 3,146,473 | 9/1964 | Hoff | 11/1 B |

FOREIGN PATENT DOCUMENTS

937,102  12/1955  Germany .................... 11/1 AD

Primary Examiner—Douglas J. Drummond
Attorney, Agent, or Firm—Dowrey & Cross

[57] ABSTRACT

The sheets in a column of compartments of a sorter, collator or the like are jogged to align their edges. An endless belt is moved past a glue dispenser to coat a length of the belt corresponding to the number of compartments to be covered. The belt is then moved into engagement with the edges of the sheets in those compartments to deposit the adhesive on the edges. The operation is then intermittently repeated along the edges of the sheets to bond the desired extent of the length of the edges. A jogging mechanism aligns and holds the edges in alignment for binding.

3 Claims, 20 Drawing Figures

SHEET BINDING APPARATUS

This is a division, of application Ser. No. 387,541, filed Aug. 10, 1973 now U.S. Pat. No. 4,009,071.

BACKGROUND OF THE INVENTION

This invention pertains to sheet binding apparatus and, more particularly, to in-line binding techniques for collators, sorters or the like.

DESCRIPTION OF THE PRIOR ART

It has long been necessary in the collator, sorter or like fields, where sheets or stapled groups of sheets are individually, fed into spaced compartments, to remove the collected sheets in order that their edges be bound into a multipage document. This is known as "off-line" binding as compared to doing the binding while in the collator or sorter which would be called "in-line" binding.

Another problem in the prior art has been the difficulty in simultaneously binding the edges of many compartments full of sheets even in conventional binders. In general, the conventional techniques for binding multiple groups of sheets involve moving the groups of sheets past the binding medium. Movement of the sheets has prevented the conventional techniques from being useful in an in-line sheet sorter.

Sheet joggers for collators, sorters or the like, have heretofor jogged one edge only of the sheets to align the sheets along that edge, with the remaining right angle edges being left generally out of alignment. This has been conventionally accomplished with an active or movable edge jogger for the side edge and merely a passive decelerator or stop for the edge at 90° to the side edge. As a result, the sheets are not adequately aligned during the sorting or collating operation sufficient to bind the sheets into a permanent document.

SUMMARY OF THE INVENTION

It is an object of this invention to provide a method and apparatus for binding sheets in-line on a collator, sorter or the like.

It is another object of this invention to provide apparatus for simultaneously binding sheets in one or several selected numbers of compartments.

It is still another object of this invention to provide apparatus for binding at one or more locations along the length of a group of sheets.

It is another object of this invention to provide apparatus for applying single or multiple coatings of adhesive to one or more locations along the length of sheets in all of the occupied compartments in a collator, sorter or the like.

These objects are best obtained by providing a plurality of spaced sheet receiving compartments, means for loading sheets in the compartments with the superimposed edges of the sheets all being in a single plane, and means for binding the outer edges of all sheets in a desired number of loaded compartments simultaneously. In the preferred form, the binder is a part of a collator, sorter or the like but the principles of the invention also can be used in an off-line binding apparatus.

In the preferred apparatus, control means are provided for selectively locating the adhesive along one or more points on the lengthwise edges of the sheets. Furthermore, in the preferred embodiment, less than all of the occupied compartments can be bound. Still further, in the preferred embodiment, multiple coatings of adhesive can be applied to the edges.

In the in-line machine it is generally desirable to first align the two sets of right angle edges prior to applying the adhesive. It is therefore another object of this invention to provide in a collator, sorter or the like with side edge joggers which actively move the edges into respective common planes.

This object is best obtained by providing a first sheet edge engaging means for positioning a first edge of each sheet, movable second sheet edge engaging means for moving an opposite edge toward said first sheet edge engaging means, third sheet edge engaging means for positioning a third edge of the sheet, and movable fourth sheet edge engaging means for moving a fourth edge opposite said third edge toward said third sheet edge engaging means. In the preferred embodiment, the first and third sheet edge engaging means includes fixed edge stops and said second and fourth sheet edge engaging means include movable elongated bars. Sheets cushioning means is also provided for stopping the sheets as they are delivered to the compartments to avoid damage to the edges of the sheet.

The advantages of the apparatus are quite apparent. In the in-line apparatus, a savings in handling is readily available since the sheets are removed from the sorter or collator in a permanently bound condition. In the alternative, the sheets can be merely tacked at one or more spots on the sheets to temporarily hold the sheets in a bound condition for subsequent permanent binding with a permanent cover. The temporary binding, however, allows the sheets to be properly aligned in the collator or sorter and not lose this alignment enroute to the permanent binder.

In either an in-line or off-line binder the versatility available in binding sheets in one or any selected number of compartments simultaneously allows some of the compartments to have their sheets bound while others remain loose as desired. Since less than the entire edges can be bound if desired, the bound document may be more easily provided with tear out pages or be available for other uses not requiring a permanent binding.

While in the preferred form, a unique and novel endless belt is utilized for applying a liquid adhesive to the edges of the sheets, it should be understood that the broad principles of the invention are equally applicable to other types of binding mediums. For example, the edges can be precoated and bound in the collator or sorter by spraying or applying heat or light. Furthermore, in an off-line binder the compartments can be spaced horizontally and the binding medium moved in a vertical plane into contact with the sheets. Other advantages will be apparent to one skilled in the art.

DETAILED DESCRIPTION OF THE PREFERRED EMBODIMENTS

Figure 1:
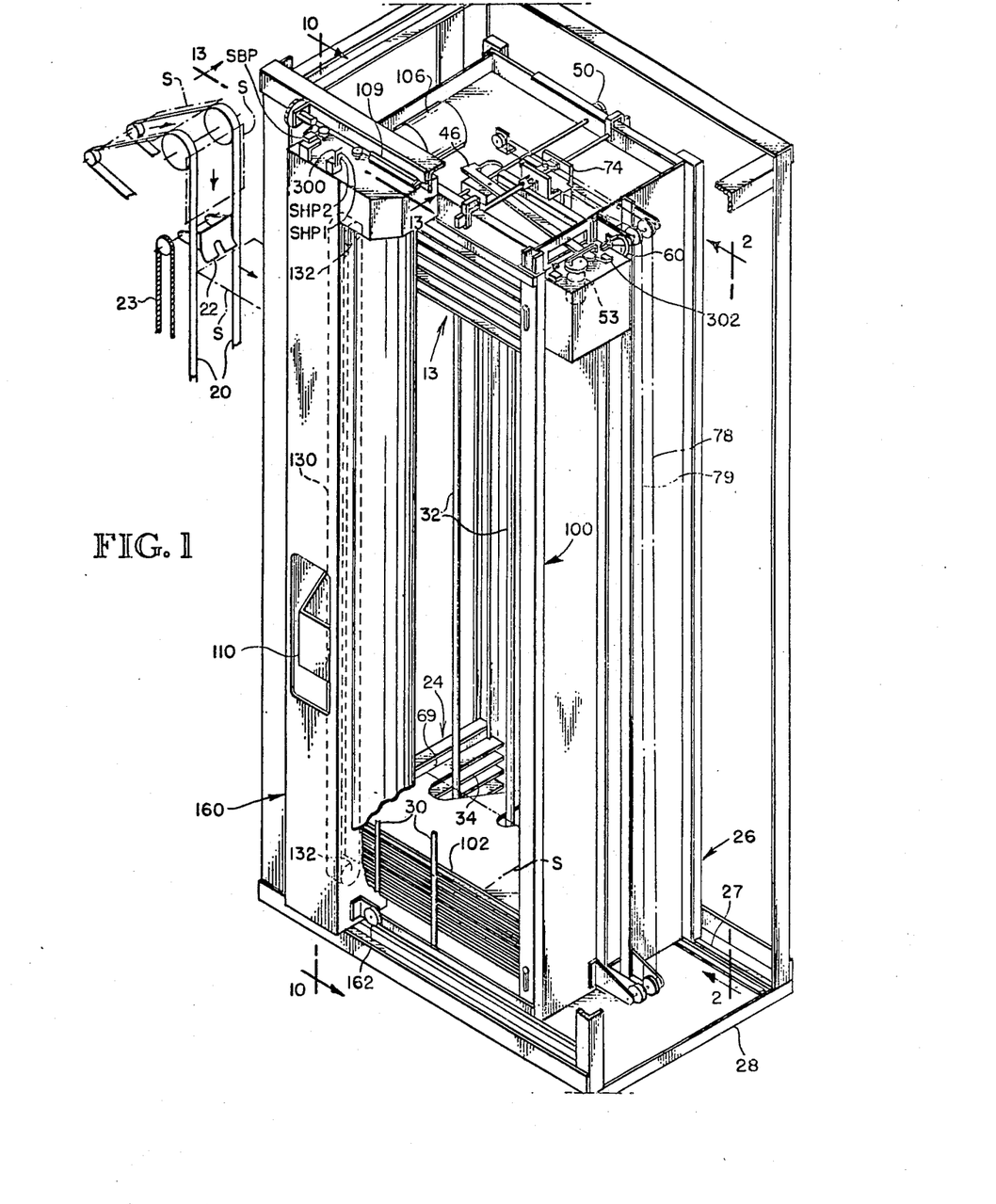
FIG. 1 is an isometric view of a sorter, or the like embodying the principles of the invention.
Figure 3:
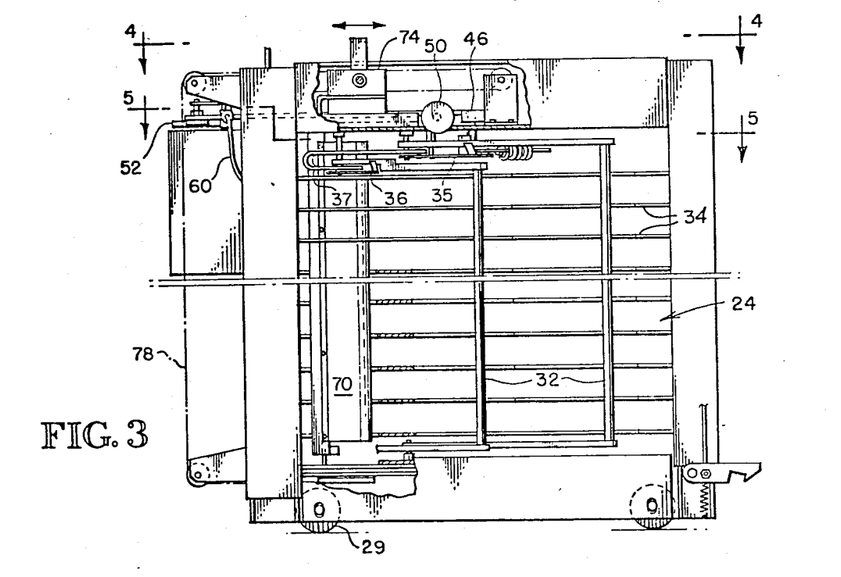
FIG. 3 is a side elevation taken along the direction of the arrows 3—3 of FIG. 2.

In general, the apparatus of this invention is best illustrated in FIG. 1 as used with a sheet sorter. As is well known, the sorter includes a sheet feeding means such as the belts 20 which direct sheets of paper S along a path intersecting with a movable deflector 22. The deflector is positioned vertically by an endless chain 23 and deflects the paper from the belts 20 into a vertical column of sheet bins or compartments 24. As thus far described, a suitable sorter is disclosed in U.S. Pat. No. 3,604,321 which is incorporated herein by reference. The compartments are housed in a movable frame 26 which is supported by rollers 29 (FIG. 3). The rollers ride in a track 27 which is part of a base 28. The rollers permit the movable frame to be moved away from the sheet feeding means for clearing jams. While this type of sheet compartment unit is described, it should be understood that the invention is usable with other well known sorting machines.

Jogging Apparatus

Within the movable frame 26 a side edge sheet jogger and an end edge sheet jogger are provided. The terms side edge and end edge will be used throughout this specification for purposes of description, however, it should be understood that sheets may be fed into the compartments with a lengthwise edge forwardmost or a side edge forwardmost and in the latter case for the purpose of definition, the sorter end edge will become the side edge. The side edge jogger is best illustrated in FIG. 1, 3, 5, 7 and 8. The side edge sheet jogger includes a pair of fixed gauge bars 30, positioned along one opened side of the row of compartments and a pair of movable jogging bars 32, movable within slots 34 of the compartments. The movable jogging bars 32 are oscillated by a pair of bell cranks 35 and 36 which are oscillated in unison by link 37.

A main bell crank 44 is oscillated by a lever 46. The lever pivots about a pin 47 on an adjustable bracket 48. The bracket is threaded on an adjustment shaft 50. The remote end of the lever 46 is powered by an electric motor 53 which rotates the cam 52 between the solid line and dotted line position in FIG. 4. Rotation of the cam 52 causes the elongated side edge sheet jogging bars 32 to move in and out in unison to move the sheets over against the fixed gauge bars 30.

Figure 2:
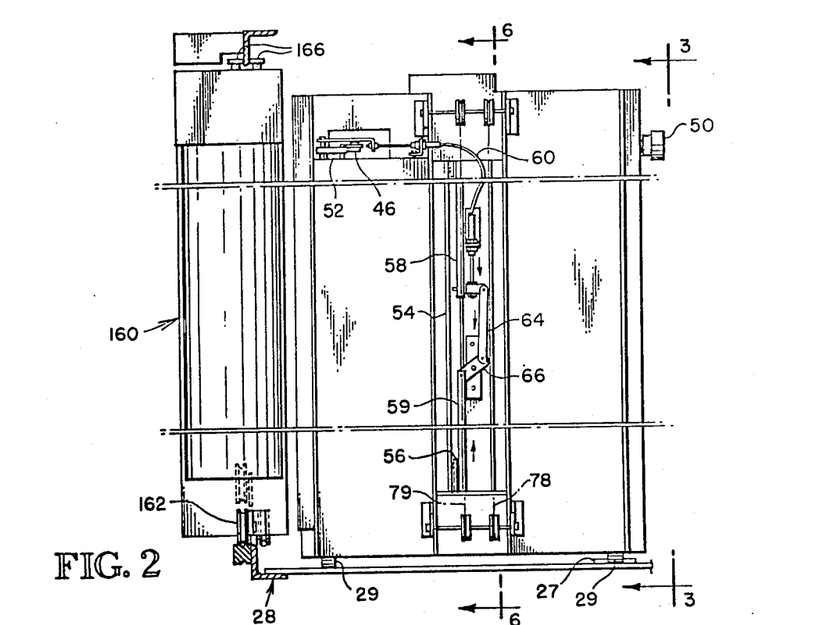
FIG. 2 is a vertical section taken along the line 2—2 of FIG. 1.
Figure 6:
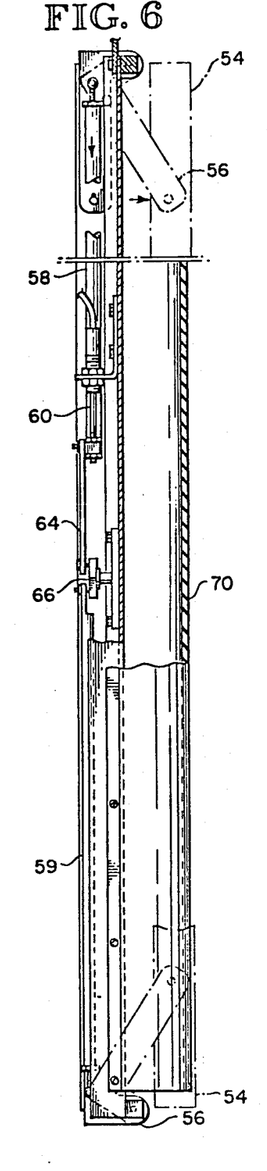
FIG. 6 is a fragmentary vertical section taken along the line 6—6 of FIG. 2.

Side edge sheet jogging bars have been known heretofore. It is a unique feature of this invention, however, to provide an active end edge sheet jogging bar in conjunction with the active side edge sheet jogging bars to align the right angle edges of the sheets suitable for binding the sheets together. For this purpose, an end edge sheet jogging bar 54 is located at the rear wall of the compartment 24. As best shown in FIGS. 2 and 6, the bar 54 is joined at each end to bell cranks 56. The bell cranks are oscillated by links 58 and 59. Link 58 is reciprocated by a push-pull cable 60 that is coupled to the cam 52. Link 59 is also reciprocated by the cable 60 via a set of links 64 and 66. Consequently, rotation of the cam 52 causes simultaneous oscillation of the side edger bars 32 and the end edge sheet jogger 54.

The end edge jogger moves the sheets forwardly against the forward inside edge 69 of the lower surface of the compartments 24. Also located at the rearward end of the compartments 24 is a passive sheet stop 70. The passive sheet stop is an elongated bar having a substantial thickness of foam rubber or the like at its forward end. The foam rubber absorbs the impact of the sheet as it is moved into the compartment from the deflector 22 and protects the edge from being damaged.

Figure 7:
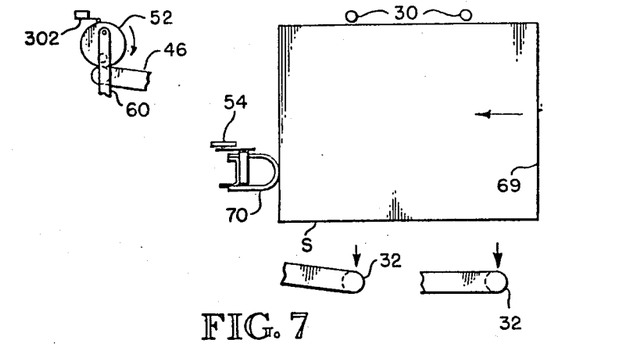
FIG. 7 is an operational schematic illustrating the end and side edge joggers prior to jogging the sheet into a desired position.
Figure 8:
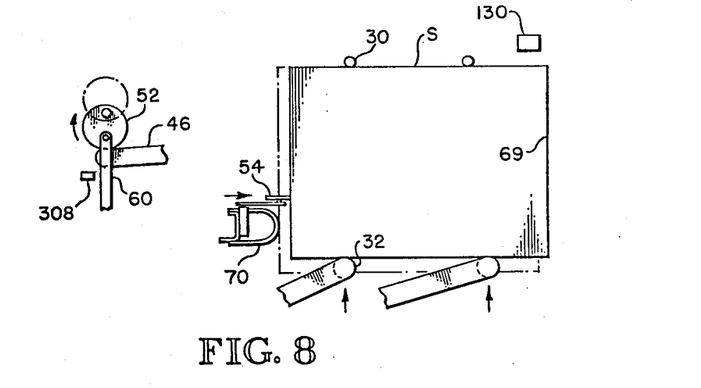
FIG. 8 is an operational schematic showing the joggers contacting the sheet and moving it into an aligned position.

FIGS. 7 and 8 show the operation of the joggers. In FIG. 7 a sheet has just come to rest against the passive end stop 70 and the jogger bars 32 and 54 are separated from the sheet. In FIG. 8, the cam plate 52 has rotated into the solid line position simultaneously moving the side edge joggers 32 and the end edge sheet jogger 54 against a sheet to move the sheet upward and to the right as viewed in FIG. 8. In this position the edges of the sheet abutted against the gauge bars 30 are all in the same vertical plane and the end edges are also in a vertical plane making the groups of sheets suitably arranged for binding.

Figures 4, 4A, 4B, 5:
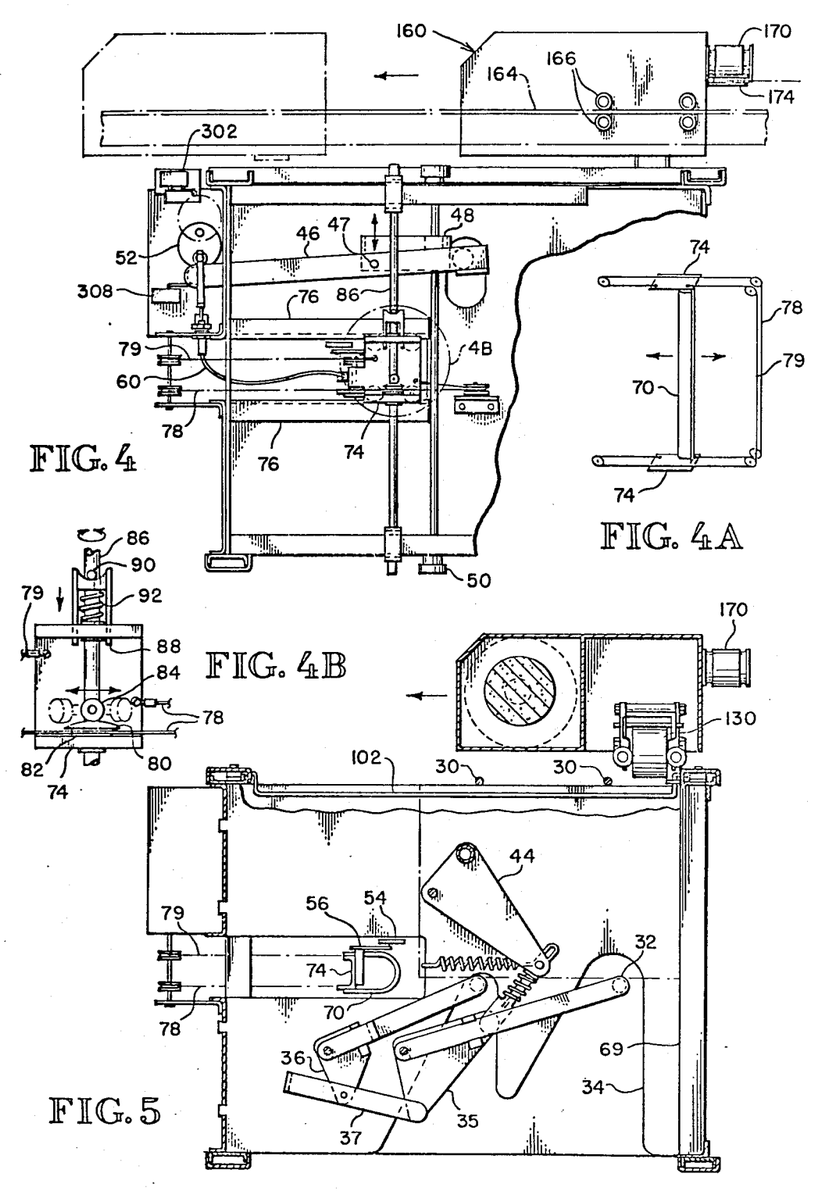
FIG. 4 is a plan view taken along the line 4—4 of FIG. 3.
FIG. 4A is a schematic illustration of a portion of the jogging mechanism.
FIG. 4B is a fragmentary illustration of another portion of the jogging mechanism.
FIG. 5 is a horizontal section taken along the line 5—5 of FIG. 3.

The end edge sheet jogger bar 54 and sheet stop 70 can be positioned relative to the compartments to provide for differing sheet sizes, as best shown in FIGS. 4A and 4B. As best shown in 4A, the end edge jogger 70 is carried on a frame 74 which slides in a pair of spaced tracks 76. The frame is positioned toward and away from the compartments by a parallelogram cable system 78. The cable system couples the upper end of the frame 74 to the lower end of the frame so that both ends move in direct parallelism with each other to keep the active joggling element 54 in a straight vertical line. The frame 74 is locked in its set position by a brake 80 that is pushed against a brake shoe 82 by a movable roller 84. As best shown in FIG. 4B, the roller can be placed in its centermost position pushing the brake shoe 82 against the brake 80 to lock the frame 74 or can be swung laterally to the phantom line position to release the brake shoes 80 and 82. An operator controlled rod 86 is coupled to the roller 84 and passes through a latching mechanism 88. The latching mechanism includes a concave cam surface and a pin 90 that passes through the rod 86. As can be readily seen, rotation of the rod 86 moves the bracket 88 to the right moving the roller 84 to the phantom line position and releasing the frame 74. When the operator releases the rod 86, a spring 92 urges the pin 90 back to its original position, pulling the roller 84 automatically into its braking position.

Figure 13:
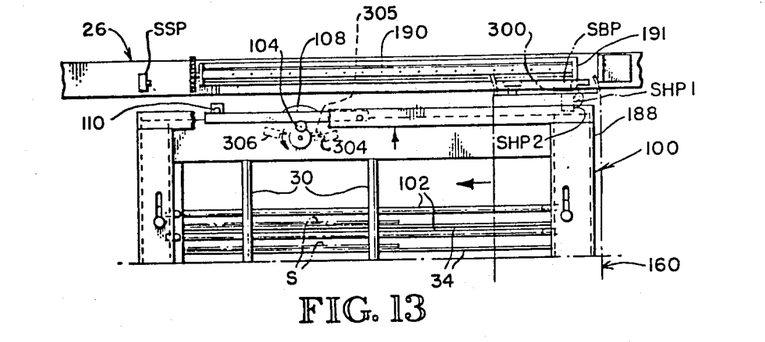
FIG. 13 is a fragmentary side elevation with parts broken away for clarity taken generally in the direction of the arrows 13—13 of FIG. 1.
Figure 14:
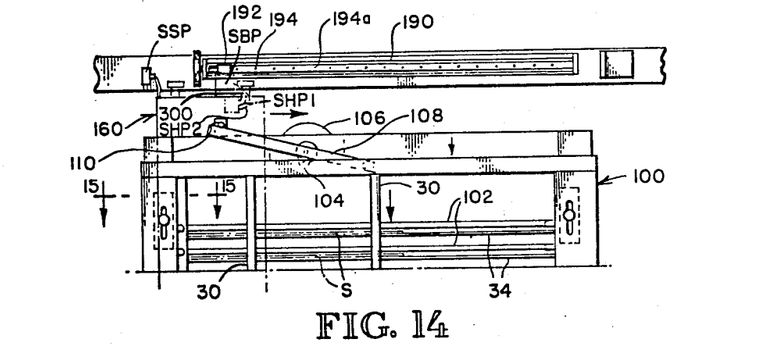
FIG. 14 is a similar fragmentary side elevation showing the clamping bars for compressing the edges in an operative position.
Figure 15:
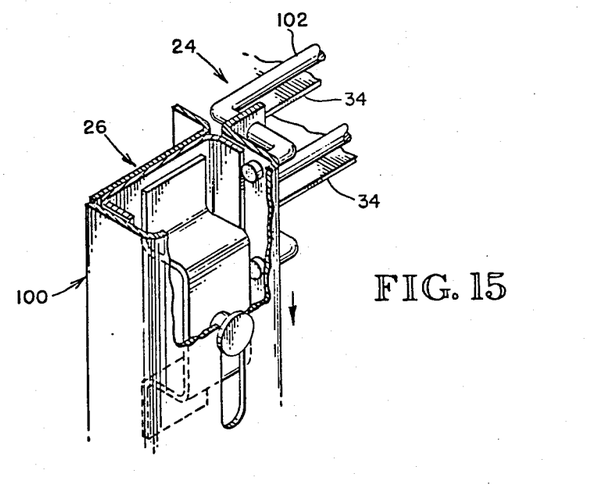
FIG. 15 is a fragmentary isometric looking generally in the direction of the arrows 15—15 of FIG. 14.

As thus far described, it can be seen that a plurality of sheets can be readily stacked in the various compartments and their edges aligned in vertical planes. It is another unique feature of this invention that the edges can be bound while in this position. In the preferred embodiment the apparatus is provided with a weight bar frame 100 which, as best shown in FIG. 13–15 is provided with a plurality of bars 102 each positioned in a compartment 24. The purpose of the bars 102 is to compress the edges of the groups of aligned sheets to hold them with enough pressure to maintain their alignment as the binding medium is being applied to the edges of the sheets. In the preferred embodiment, the pressure is derived from the weight of the frame 100 as it is allowed to move downwardly. In FIG. 13, it can be seen that the weight bar frame is held upwardly by a pin 104 mounted on a cam rotated by motor 106. The pin rolls against a link 108 that is pinned at one end to the weight bar frame and rests along its upper edge on a pin 110 fixed to the main frame of the machine. When the pin is in its uppermost position, the weight frame is held up. As the motor is energized to allow the pin 104 to move to the position shown in FIG. 14, the link 108 is lowered at its right end, allowing the weight bar frame to drop with its bars 102 coming to rest on the sheets of paper adjacent the fixed gauge bars 30.

The binding apparatus further comprises a liquid bonding medium preferably a hot melt glue which is contained in a pot 110. A sliding gate valve dispenses the glue to a discharge passage 112. The sliding gate valve includes a gate 114 of thin metallic material which slides between a pair of O rings 116 which are concentric about an opening which communicates with the discharge passage 112. Movement of the gate into the phantom line position in FIG. 12 opens the valve. The gate is oscillated about a pivot point 118 by a pin 120 that is fixed on an elongated link 122. The link 122 is coupled to a solenoid 124. Upward movement of the arm of the solenoid allows a spring 126 to raise the pin 120 thus closing the gate 114. Downward movement of the solenoid pulls the pin 120 downward to open the gate.

Figures 10, 11, 12:
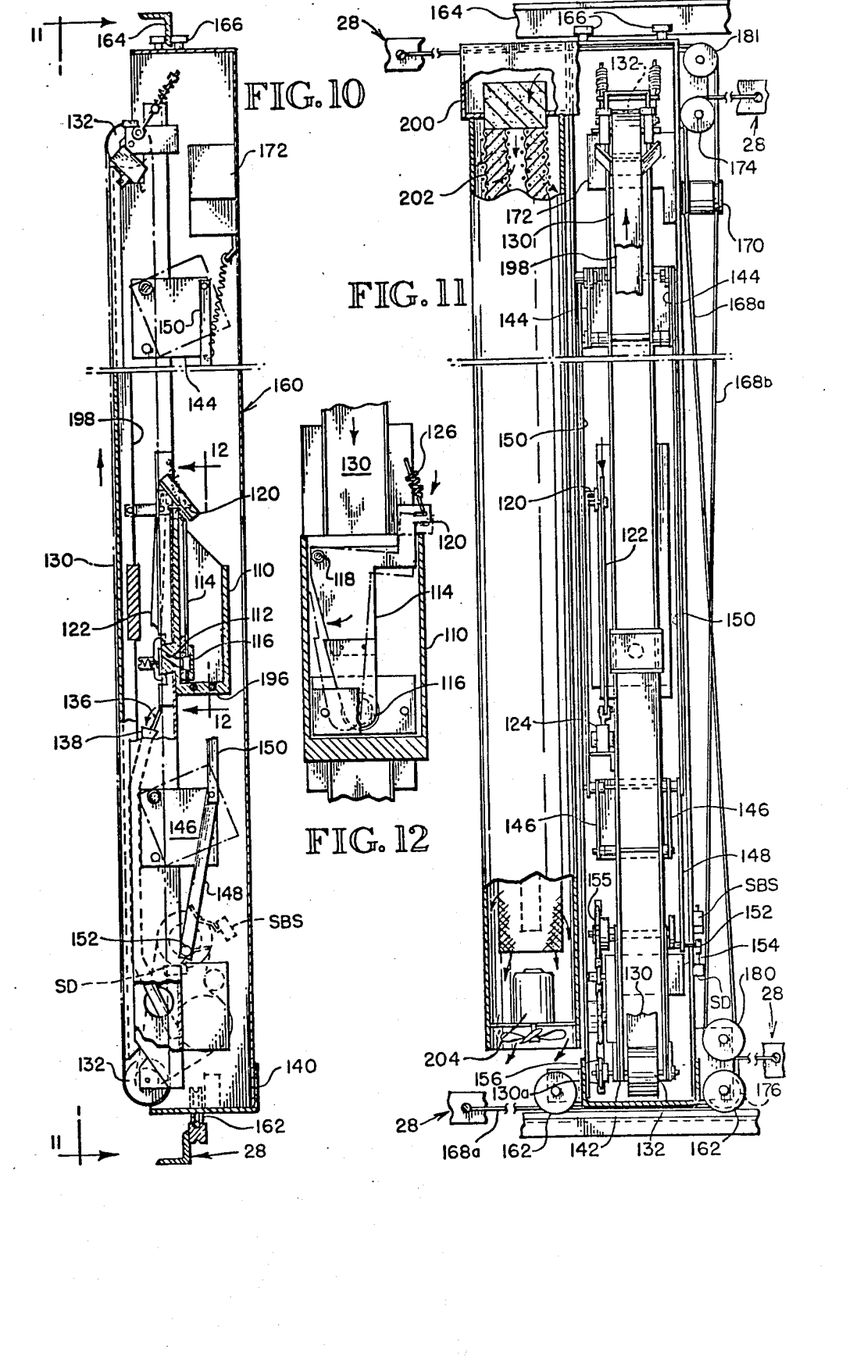
FIG. 10 is a vertical section taken along the line 10—10 of FIG. 1.
FIG. 11 is a side elevation taken along the line 11—11 of FIG. 10.
FIG. 12 is a fragmentary vertical section taken along the line 12—12 of FIG. 10.

The transferring mechanism for moving the glue from the discharge passage 112 to the edges of the sheets is best shown also in FIGS. 10 and 11 and includes an endless metallic belt 130 which passes over upper and lower pulleys 132 following a path which passes the outer surface of the belt over the remote opening of the discharge passage 112. As the belt passes the discharge passes, it picks-up a supply of glue and carries it downwardly about the lower roller 132 and then upwardly to a desired position opposed to the edges of the sheets in the desired compartments. As is readily apparent, the belt can be moved all the way to the top roller 132 to cover all compartments or can be rotated only far enough to have the glue coated portion of the belt against the lowermost compartments. Any glue that migrates around to the inside surface of the belt is removed by a scraper 136 that allows the glue to flow through a tube 138 into a clean out tray 140.

In FIG. 10, the belt 130 is shown in an extended position such that it engages against the side edges of the sheets S abutting the gauge bars 30. The belt is of a substantially narrow width such that it covers only a small portion of the edges during each period of contact. It is thus necessary to retract the belt and replenish the supply of glue on the belt prior to again contacting the sheets either for a second coating of glue or at a second location along the edges. For this purpose, the rollers 132 for supporting the belt are rotatably mounted in a frame 142. The frame is movably supported by upper and lower identical linkages 144 and 146. Connecting links 148 and 150 oscillate the linkages 144 and 146 in unison to provide a parallelogram linkage connection between the frame 142 and the main frame of the apparatus. The links 148 are mounted on a crank 152 that is rotated by a reversible electric motor 154. The reversible electric motor is also coupled to the belt rollers 132 by a chain and sprocket system 156. A lower roller drive sprocket 132a and a crankshaft drive sprocket 155 are provided with overrunning clutches so that operation of the drive motor 154 in one direction rotates the lower drive roller while the crankshaft idles and vice versa. Thus, with the use of the single motor 154, either the belt or alternatively the linkages 144 and 146 are in operation. In the retracted position, the belt is moved away from the edges of the sheets so that the replenished surface of the belt is free to move upwardly into position for the next coating.

The glue coated portion of the belt 130 can be positioned vertically to cover a selected number of compartments, by making adjustments to timer that controls motor 154. The belt is also positionable laterally so that coatings of glue can be applied to the edges of the sheet in the compartments at any location or locations along the edges of the sheet. For this purpose, a housing 160 supports the binding apparatus and is carried by rollers 162 (FIG. 10) at its lower end. The upper end of the housing is guided along a channel 164 by a pair of rollers 166. The housing 160 is moved laterally by a cable and winch system employing a cable 168a that dead ends on the frame 28 at two places. The cables pass beneath the rollers 162 and up to a winch drum 170. The winch drum is powered by a reversible motor 172. As is best shown in FIG. 11, one cable 168a takes a one loop turn around the winch drum on the left side, as viewed in FIG. 11, then upwardly about a pulley 174 on the housing 160 and across again to the frame 28. A second cable 168b is secured to the frame 28 in two places and then passes around pulleys 180 and 181 which are fixed to the housing 160 and thence again to the main frame 28. As is readily understood, rotation of the motor to raise the lower portion of the cable 168a forces the rollers 162 to the left thus moving the housing to the left as viewed in FIG. 11. Downward movement of the lower portion of the cable 168a pulls the pulley 174 to the right thus moving the housing to the right as viewed in FIG. 11.

As shown in FIG. 13, the housing 160 is shown in phantom lines in its home position. In this position, the housing is partly shielded by a plate 188 which helps to retain heat and direct air into the housing. The motor 172 is energized by signals from a switch SBP that is actuated by buttons 194 on a control bar 190 rotatably carried in a frame 191. The buttons can be eliminated as at 194a to skip a location on the sheets. Any number of buttons and spaces may be used to determine the location of the glue on the edges of the sheets. The rod is rotatable and has six sides each with a different set of buttons for selective programming. As will be described below, the housing 160 moves to the left as shown in FIG. 14, and then returns under control of the button arrangement as it moves to the right going through one or more complete sheet contacting and glue replenishing cycles at each of the contact locations.

The glue pot 110 is provided with heating elements 196 to keep the contents of the pot in liquid state. A backing bar or channel 198 is provided behind the belt 130 and is also suitably heated its entire length to keep the glue on the belt in a liquid state. The undesirable odors that may occur from the molten glue are removed by connecting the upper end of the housing to a filter box 200 having a filter 202. Air and fumes are drawn from the housing 26 through the filter by a fan 204 such that the air leaving the bottom of the filter box is substantially free of odors.

Figure 16:
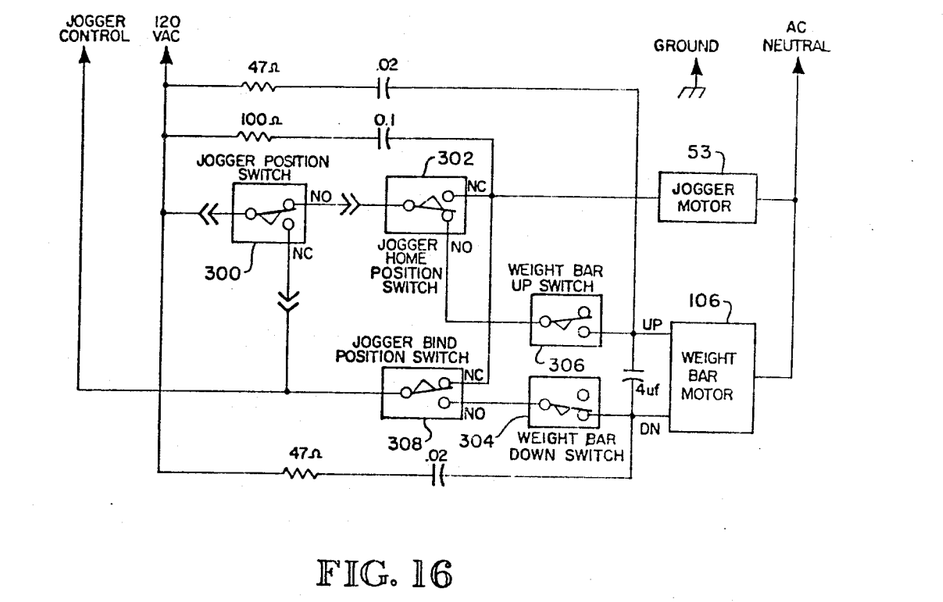
FIG. 16 pertains to the jogger controls, FIGS. 17 pertains primarily to the glue coating controls, and FIG. 18 pertains primarily to the binder positioning controls.
Figure 17:
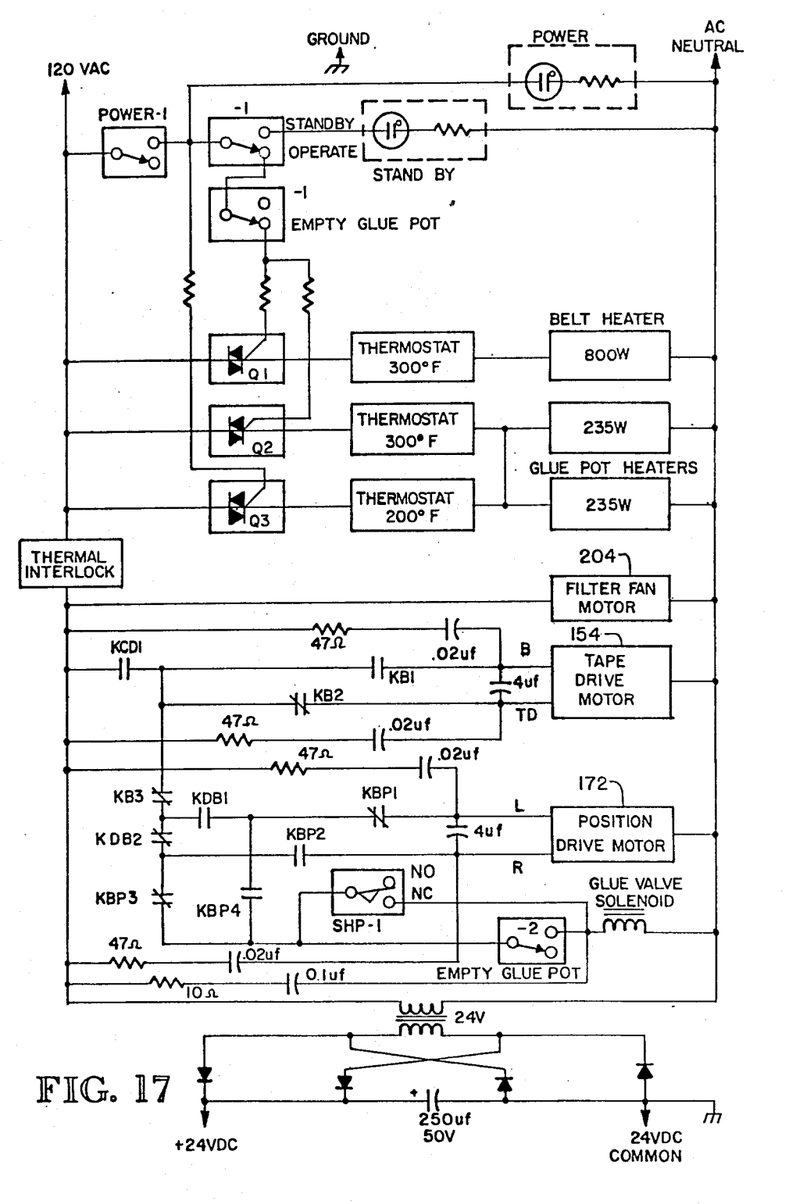
Figure 18:
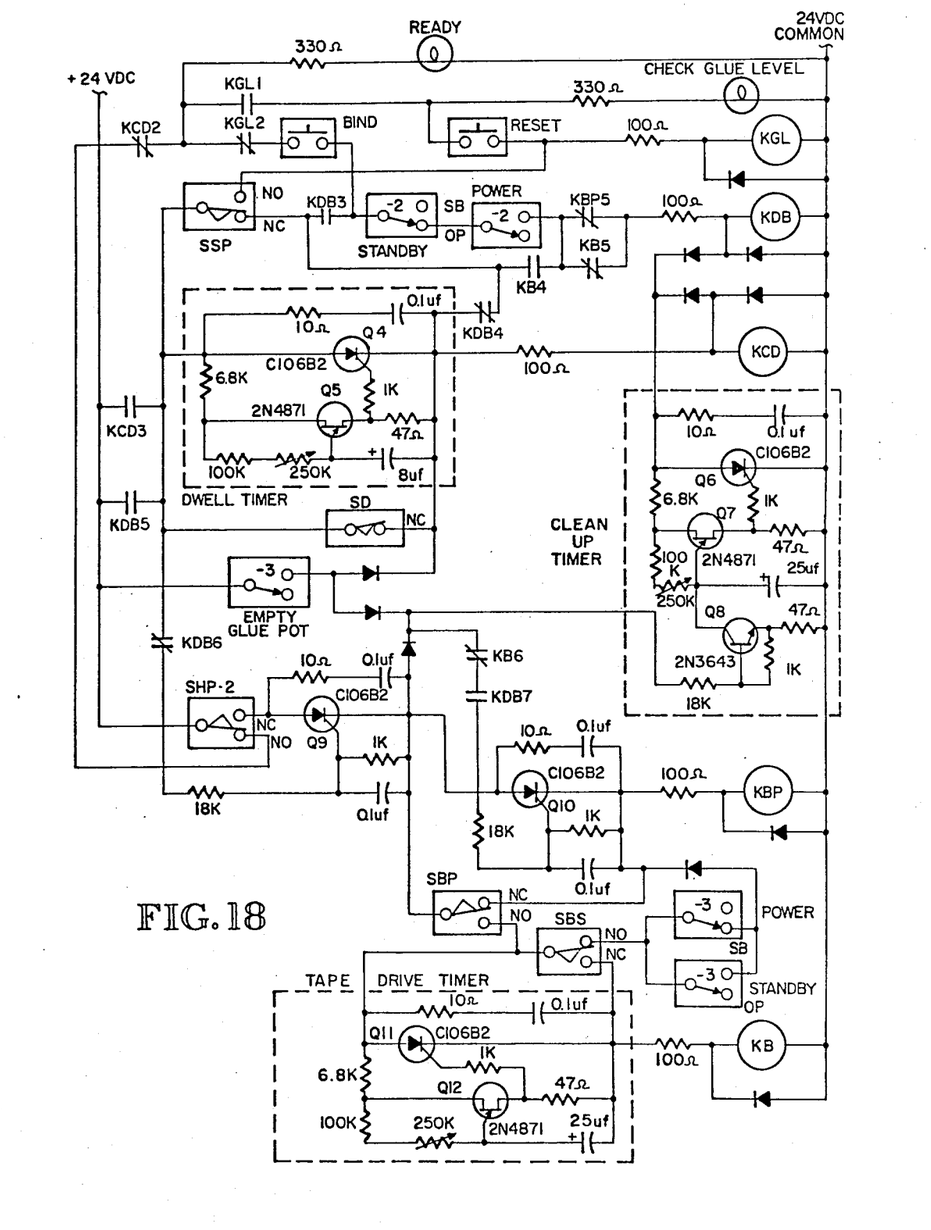

The method of in-line binding of sheets in a collator, sorter or the like, comprises feeding the sheets into a plurality of spaced compartments, aligning the edges of the sheets in the compartments, compressing those edges of the compartments where the glue is to be applied and applying a bonding medium to the edges. The preferred embodiment described in this application uses a hot melt glue with a belt for distributing the glue to the edges of the sheets. The preferred method is best understood by describing it in conjunction with a description of the operation of the machine and the wiring schematic illustrated in FIGS. 16–18.

SEQUENCE OF OPERATION

I. Power on.
  A. Standby Switch (FIG. 17) in "Standby."
     Power is applied to the gate of Q3 only and the glue pot heaters 196 will heat the glue to 200° F. This allows the glue to come up to operating temperature more quickly when called for.
  B. Standby Switch in "Operate."
     Power is applied to the gates of Q1, Q2, Q3, and current flows through the glue heaters. When the temperature in the glue pot 110 reaches 250° F, the thermal interlock is actuated, applying power to the filter fan motor 204 and to the 24 volt power supply. The "Ready" indicator (FIG. 18) is lighted through control/dwell relay contacts KCD-2 and binder home position switch SHP-2NO. Switch SHP-2 is shown in an actuated position whereas switch SBP is shown deactuated using standard switch symbols for switches having an internal snap-action bias to the deactuated position. The binder is now ready to operate.

Figure 9:
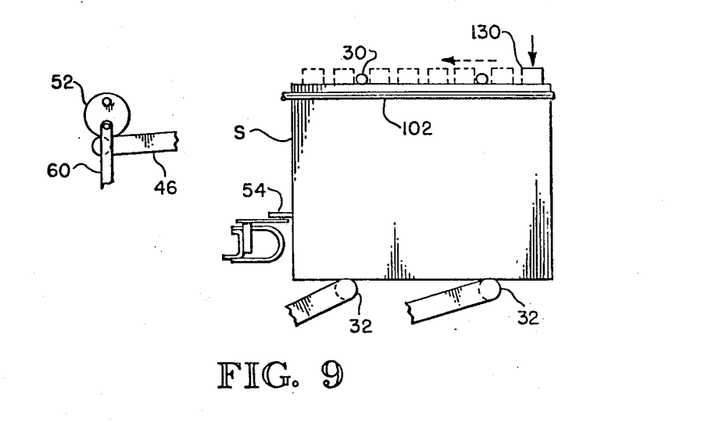
FIG. 9 is an operational schematic illustrating the joggers in combination with an edge compressing bar when the jogger is used in combination with a binder embodying the principles of the invention.

II. Bind
  A. Manually push "Bind" switch (FIG. 18).
     1. Double bind relay KDB is energized through bind position relay contact KBP-5, power switch, "Standby" Switch, "Bind" Switch, glue level relay contact KBL-2, KCD-2, and SHP-2NO. Holding path for KDB is through KDB-3, SSP, and KDB-5.
     2. KCD is energized through SK and KDB-5.
     3. Tape drive motor 154 is energized through bind relay contacts KB-2 and KCD-1 and tape 130 starts moving.
     4. Position drive motor 172 is energized through KBP-1, KDB-1, KB-3, and KCD-1, and the binder begins to move toward the start position to the left in FIG. 13. Note: If the binder does not reach the start position due to a fault in the machine (should take about 5 seconds) the clean-up timer will time out. Q6 will start drawing current and short out KCD and KDB causing them to de-energize. KCD-3 and KDB-5 will open and current flow through Q6 will stop, terminating the bind cycle.
  B. The jogger position switch 300 (FIG. 16) moves off the frame 191 and thus is de-actuated as the binder moves toward the start position, to the left in FIG. 1.
     1. Jogger motor 53 is energized and runs until the jogger bars 32,54 (FIG. 9) are tight against the paper to be bound.
     2. Jogger bind position switch 308 is actuated by lever 46 removing power from the jogger motor and the jogger bars remain tight against the paper.
     3. Weight bar motor 106 is energized and runs until the weight bars are lowered by gravity onto the paper stack.
     4. Weight bar down switch 304, is actuated by a contact 305 on the cam rotated by motor 106, removing power from the weight bar motor, allowing the weight bars to remain on the paper stack.
  C. Start position switch SSP (FIG. 14 and 18) is actuated.
     1. KDB is de-energized.
     2. KDB-1 opens, removing power from the position drive motor and the binder stops moving.
     3. KGL is energized by the N.O. contacts of SSP. Note: KGL is energized and de-energized once for each complete binding cycle. When KGL has been energized and de-energized five times, its contacts will actuate, lighting the "Check Glue Level" indicator. Before the next binding cycle can be initiated, the operator must go to the rear of the machine, check the level of glue in the pot and add some if needed. Then the "Reset" switch located near the glue pot must be depressed to de-energize KGL's contacts. Now the operator is again able to initiate a binding cycle.
     4. KDB-6 applies power to the gate of Q9 and KBP (FIG. 18) is energized through SBP, Q9, and SHP-2NC.
     5. Position drive motor 172 (FIG. 11) is energized through KBP-2, KDB-2, KB-3 and KCD-1 causing the binder to move in the opposite direction to the right in FIG. 13 toward the home position.
     6. Power is applied to the base of Q8 through Q9 and SHP-2NC disabling the clean-up timer (FIG. 18).
     7. SSP is de-actuated as the housing 160 moves, de-energizing KGL.
  D. SBP (FIG. 1 and 18) is actuated by a button 194 on the control bar 190 as the binder continues to move toward the home position.
     1. SBP-N.C. contacts open, de-energizing KBP, and KBP-2 opens stopping the position drive motor 172.
     2. Glue valve solenoid 124 (FIG. 17) is energized through SHP-1N.C., KBP-3, KDB-2, KB-3 and KCD-1 and glue is applied to the moving tape 130.
     3. Power is now applied to the tape drive timer circuit (FIG. 18) through SBP-N.O.
     4. The tape drive timer times out in approximately 8 seconds and KB (FIG. 18) is energized through Q11. (It takes about 8 seconds for the tape to be completely coated with glue from top to bottom.)
     5. KB-3 opens, removing power from the glue valve solenoid and the glue valve 114 (FIG. 12) closes.

6. KDB is energized through KBP-5, KB-4, and SSP-N.C. providing its own holding path through KDB-3.
7. KDB-4 opens, removing a potential holding path for KCD but a holding path for KCD exists through dwell switch SD (FIG. 18).
8. Power is removed from the tape drive motor 154 through KB-2 and is re-applied to the tape drive motor through KB-1, causing the motor to turn in the opposite direction. This action, through two overrunning clutch mechanisms, causes the tape drive to stop and moves the binding mechanism in toward the paper to be bound.
9. Bind stop switch SBS (FIG. 10) will de-actuate and current for KB will flow through it, stopping current flow through Q11.
10. SD (FIG. 10) will actuate when contact is made between the glue on the tape and the paper to be bound.
11. SD-N.C. contacts open, de-energizing KCD and the dwell timer starts.
12. KCD-1 opens, removing power from the tape drive motor causing the binding mechanism to be held in contact with the paper. This causes the glue to be absorbed into the paper for a strong bond between sheets.
13. The dwell timer times out in approximately two seconds and KCD is energized through Q4.
14. The tape drive motor is again energized through KB-1 and KCD-1, and the binding mechanism moves back toward its original position and no longer contacts the paper.
15. SD is de-actuated and current for KCD will flow through it, stopping current flow through Q4.
16. SBS will actuate when the binding mechanism is as far back from the paper as possible and KB will become de-energized.
17. Current will now flow through the tape drive timer circuit.
18. KB-1 opens, removing power from the tape drive motor and the binding mechanism stops moving.
19. Power is reapplied to the tape drive motor through KB-2 causing the motor to turn in the opposite direction and the tape starts moving.
20. Power is applied to the gate of Q10 through KDB-7 and KB-6 energizing KBP.
21. Holding path for KDB is now through KB-5, standby switch, power switch, and KDB-3.
22. Glue valve solenoid 124 is energized through SHP-1N.C., KBP-4, KDB-1, KB-3, and KCD-1, and glue is applied to the moving tape.
23. When the tape has received a new application of glue and the tape drive timer times out, KB is energized.
24. KB-3 opens, removing power from the glue valve solenoid and the glue valve closes.
25. KB-5 opens, removing the holding path for KDB causing it to de-energize.
26. KB-2 opens, KB-1 closes, and the tape drive motor turns in the opposite direction, stopping the tape drive and causing the binding mechanism to move toward the paper.
27. SBS will de-actuate and current for KB will flow through it, stopping current flow through Q11.
28. When contact is made between the glue on the tape and the paper, SD will actuate. This time KCD will not de-energize due to the holding path through KDB-4 and the binding mechanism will immediately move back away from the paper. This coating of glue adds strength to the first application
29. SBS will actuate when the binding mechanism is as far back from the paper as possible and KB will become de-energized.
30. Current will now flow through the tape drive timer circuit.
31. XB-1 opens, removing power from the tape drive motor and the binding mechanism stops moving.
32. Power reapplied to the tape drive motor through KB-2 causing the motor to turn in the opposite direction and the tape starts moving.
33. The position drive motor is energized through KBP-2, KDB-2, KB-3, and KCD-1, and the binder begins to move toward the home position.
34. SBP will de-actuate, removing power from the tape drive timer so that there is no chance of the binding mechanism moving in to apply glue when the binder is not in the proper position.
35. Current for KBP will now flow through SBP, stopping current flow through Q10.

E. The binder will continue to move toward the home position until SBP is again actuated by a button on the control rod 190 and Step "D" will be repeated. Step "D" will continue to be repeated until SBP has moved off the last button.

F. SBP has moved off the last button on the control rod and SBP is de-actuated.
1. The jogger position switch 30 is actuated as the binding mechanism nears the home position.
2. Jogger motor 53 is energized causing the jogger bars to move away from the paper to the jogger home position.
3. Jogger home position switch 302 is actuated, stopping the jogger motor and energizing the weight bar motor 106 through the weight bar up switch 306.
4. Weight bars 102 move up away from the paper stack.
5. Weight bar up switch is actuated removing power from weight bar motor, allowing the weight bars to remain in the raised position.
6. Just before the binder reaches the home position (to the right in FIG. 13), SHP-1 is actuated by frame 191, opening the circuit to the glue valve solenoid. The glue that remains on the tape is deposited back into the glue pot as the tape continues to move.
7. When the binder has reached the home position, SHP-2 will actuate.
8. KBP is de-energized and KBP-2 opens, stopping the position drive motor 172.
9. Power is removed from the base of Q8 enabling the clean-up timer.
10. After approximately 30 seconds, all the glue will have been removed from the tape and the clean-up timer will time out.
11. Q6 will start drawing current and short out KCD.
12. KCD will de-energize, opening KCD-3 and current flow through Q6 will stop.
13. KCD-1 opens and the tape drive motor 154 stops.
14. KCD-2 will close, lighting the "Ready" indicator.
15. The binder is now ready for another bind cycle.

III. Return to Home Position During a Bind Cycle.
A. The operator determines that a bind cycle should be stopped for some reason after the cycle has been started.

1. Manually place the Standby/Operate switch contacts 1, 2 and 3 in the standby position (FIGS. 17 and 18).
2. Standby/switch contacts 2 (FIG. 18) opens removing a potential holding path for KDB.
3. If KDB is energized and KB is not, KDB will de-energize immediately.
4. If KB is energized, KDB will not de-energize until KB has completed its portion of the cycle as in II.D.4–16 or 23–25.
5. Standby switch contacts 3 (FIG. 18 lower) close and KBP is energized through SBS-N.O. when KB is not energized or has completed its portion of the cycle as in II.D.4–16 or 23–29.
6. The position drive motor is energized through KBP-2, KDB-2, KB-3, and KCD-1, and the binder begins to move toward the home position.
7. The electrical system will now act as if SBP has moved off the last button on the rod 190.
8. The binder will return to home as outlined in II.F.

IV. Empty Glue Pot.

A. When glue has idled at the operate temperature in the glue pot too long, it looses some of its adherence qualities. It must then be removed and replaced with fresh glue.
1. Open inspection door at rear of binder.
2. Place an empty glue container into the glue pot.
3. Switch on the empty glue pot switch contacts 1, 2 and 3 (FIGS. 17 and 18).
4. Empty glue pot switch contact 1 open, putting the glue pot heaters into a standby condition through the 250° F. thermostat and Q3.
5. Empty glue pot switch contact 3 (FIG. 18) provides power for KCD and the tape drive motor is energized through KB-2 and KCD-1 causing the tape to move.
6. Power is applied to the base of Q8 disabling the clean-up timer.
7. The glue valve solenoid 124 is energized through empty glue pot switch contact 2 and glue is applied to the moving tape.
8. When the tape is completely coated with glue, the glue is scraped off the tape and deposited into the glue container that was placed in the glue pot.
9. All of the glue in the pot will now be circulated onto the tape and into the glue container.
10. After about five minutes the empty glue pot switch is switched off.
11. Power is removed from the glue valve solenoid and the glue valve closes.
12. Power is removed from the base of Q8 enabling the clean-up timer.
13. After approximately 30 seconds, the clean-up timer will time out and Q6 will start drawing current and short out KCD.
14. KCD will de-energize, opening KCD-3, and current flow through Q6 will stop.
15. KCD-1 opens and the tape drive motor stops.
16. A new supply of glue should now be added to the glue pot.

While the preferred embodiments of the invention have been illustrated and described, it should be understood that variations and alternatives will be apparent to one skilled in the art without departing from the principles herein. Accordingly, the invention is not to be limited to the specific embodiments described.

We claim:

1. Sheet binder apparatus, comprising: sheet assembling means for assembling sheets into a stack; adhesive binding means operatively associated with said sheet assembling means for applying adhesive to bind the stacked sheets simultaneously by effecting adhesive bonds between corresponding edge portions thereof; and hold down means operatively associated with said binding means and said sheet assembling means for holding the sheets stationary to maintain edge alignment thereof during binding; said sheet assembling means including means forming a sheet stack holding compartment, means mounted adjacent said compartment for distributing individual sheets into said compartment in order to form a sheet stack therein, and jogging means mounted adjacent the sheet stack for aligning the edges of stacked sheets in said compartment.

2. The binder apparatus according to claim 1, wherein said binding means are further operable for binding the sheets at selected positions spaced apart along the length of their corresponding edge portions.

3. The binder apparatus according to claim 1, wherein said hold down means include means for clamping the corresponding sheet edge portions.

* * * * *